(12) United States Patent
Herden et al.

(10) Patent No.: US 8,989,927 B2
(45) Date of Patent: Mar. 24, 2015

(54) METHOD FOR CONTROLLING AN ANTISKID-REGULATED FRICTION BRAKE SYSTEM OF A RAIL VEHICLE

(75) Inventors: Marc-Oliver Herden, Munich (DE); Matthaeus Englbrecht, Munich (DE)

(73) Assignee: Knorr-Bremse Systeme fur Schienenfahrzeuge GmbH, Munich (DE)

(*) Notice: Subject to any disclaimer, the term of this patent is extended or adjusted under 35 U.S.C. 154(b) by 20 days.

(21) Appl. No.: 13/991,673

(22) PCT Filed: Dec. 6, 2011

(86) PCT No.: PCT/EP2011/071917
§ 371 (c)(1),
(2), (4) Date: Aug. 30, 2013

(87) PCT Pub. No.: WO2012/076523
PCT Pub. Date: Jun. 14, 2012

(65) Prior Publication Data
US 2013/0338860 A1  Dec. 19, 2013

(30) Foreign Application Priority Data
Dec. 8, 2010  (DE) .................. 10 2010 053 683

(51) Int. Cl.
*G05D 1/00* (2006.01)
*B61H 9/00* (2006.01)
*B60T 8/17* (2006.01)
*B60T 8/32* (2006.01)

(52) U.S. Cl.
CPC .............. *B61H 9/00* (2013.01); *B60T 8/1705* (2013.01); *B60T 8/3235* (2013.01)
USPC .............................................. 701/20; 303/7

(58) Field of Classification Search
CPC ... B60T 13/665; B60T 8/1893; B60T 8/3235; B60T 7/042; B60G 17/0164
USPC .................. 701/1, 20; 303/3, 7, 9, 15
See application file for complete search history.

(56) References Cited

U.S. PATENT DOCUMENTS 6,669,308 B1 * 12/2003 Aurich et al. .................. 303/15
2004/0036351 A1 * 2/2004 Mayer et al. .................. 303/139
(Continued)

FOREIGN PATENT DOCUMENTS

CN   1906071 A   1/2007
CN   101410284 A   4/2009
(Continued)

OTHER PUBLICATIONS

Search Report for German Patent Application No. 10 2010 053 683.0; Sep. 8, 2011.
(Continued)

*Primary Examiner* — Helal A Algahaim
*Assistant Examiner* — Shardul Patel
(74) *Attorney, Agent, or Firm* — Barnes & Thornburg LLP

(57) ABSTRACT

A method for controlling an emergency brake device of a rail vehicle or rail vehicle train consisting of several rail vehicles having axles braked by friction brakes, wherein an emergency braking operation is started by an emergency braking input, including identifying at least one axle having inadmissible brake slip during the emergency braking operation in which inadmissible brake slip occurs outside a predetermined optimal brake slip range; identifying at least one axle having no or admissible brake slip during the emergency braking operation by which axle a larger friction braking force can be transferred than by the at least one axle having inadmissible brake slip; and adjusting the friction braking forces on the at least one axle having no or admissible brake slip such that the adjustment can maintain a deviation of the actual deceleration of the rail vehicle from a target deceleration.

14 Claims, 2 Drawing Sheets

(56) References Cited

U.S. PATENT DOCUMENTS

2004/0046442 A1* 3/2004 Aurich et al. ............. 303/7
2005/0006948 A1* 1/2005 Friesen ................... 303/20
2007/0096548 A1* 5/2007 Anstey et al. ............ 303/7
2012/0018260 A1* 1/2012 Nock .................... 188/72.1

FOREIGN PATENT DOCUMENTS

| | | |
|---|---|---|
| DE | 102008063892 A1 | 7/2010 |
| EP | 2151363 A1 | 2/2010 |
| GB | 2402983 A | 12/2004 |
| WO | 0192076 A1 | 12/2001 |

OTHER PUBLICATIONS

Search Report for International Patent Application No. PCT/EP2011/071917; Feb. 28, 2012.
International Preliminary Report on Patentability, PCT/EP2011/071917 filed Dec. 6, 2011.
English Translation of Notification Concerning Transmittal of International Preliminary Report on Patentability and Written Opinion of the International Search Authority for International Patent Application No. PCT/EP2011/071917 filed Dec. 6, 2011.
English translation of Chinese Office Action, dated 127 Nov. 2014 for Chinese Patent Application No. 2011800591913.

* cited by examiner

METHOD FOR CONTROLLING AN ANTISKID-REGULATED FRICTION BRAKE SYSTEM OF A RAIL VEHICLE

PRIORITY CLAIM

This patent application is a U.S. National Phase of International Patent Application No. PCT/EP2011/071917, filed 6 Dec. 2011, which claims priority to German Patent Application No. 10 2010 053 683.0, filed 8 Dec. 2010, the disclosures of which are incorporated herein by reference in their entirety.

FIELD

Disclosed embodiments are based on a method for controlling an emergency brake device of a rail vehicle or of a rail vehicle train which is composed of a plurality of rail vehicles, which rail vehicle or rail vehicle train has a number of axles which are braked by friction brakes, and an emergency brake device which is controlled according to this method.

BACKGROUND

In rail vehicles, the transmission of braking forces and acceleration forces occurs at the contact point between the wheel and the rail. At this point, the transmission occurs by frictional engagement by braking friction forces acting between components composed of steel. A further important friction pairing is the contact between the brake linings and the brake disk or between the brake blocks and the wheel running surface, which is decisive in the case of braking. However, the frictional conditions of these instances of frictional engagement are dependent, inter alia, on the temperature, the degree of soiling and the relative speed.

The coefficient of friction, which is dependent on the instantaneous slip between the wheel and the rail, forms a significant influencing factor. The coefficient of friction may be formed, for example, by the coefficient of sliding friction for by the coefficient of static friction f, wherein both characteristic numbers of the relationship between the static friction force or sliding friction force Ff and the acting normal force Fn denote:

$$f \cong \frac{F_f}{F_n}$$

The maximum of the coefficient of friction occurs during low slip. If the slip then increases further, the coefficient of friction drops again. If the slip is then increased further, heating of the wheel and of the rail may occur as a result of the ever increasing friction power which causes damp, slippery rails to be cleaned and as a result very greatly improves the coefficient of adhesion, in particular for following wheels. Ideally, an antiskid system should set the slip of the wheels precisely in such a way that a maximum coefficient of friction is present. Since a wheel set of a rail vehicle never rolls precisely in the longitudinal direction of the rails due to the conicity of the wheels, but instead always carries out small rotational movements about the vertical axis (sinusoidal running), for example the coefficient of adhesion which can be utilized in the longitudinal direction is reduced.

Furthermore, the coefficient of friction depends to a high extent, both in terms of its magnitude and in terms of its profile, on the impurities such as water, oil, oxide layers, foliage etc., which are present between the wheel and the rail, and also on the instantaneous velocity. The coefficient of friction exhibits a falling tendency as a function of the velocity. In particular, in the fall, when there are leaves lying on the rails, a lubricating film is produced there which results in the operationally required braking performance no longer being sufficient. The rail is so smooth in such a case that the braking force which can be achieved is very low and under certain circumstances wheels slip during braking.

It is possible in such a case that during braking the braking force is set to a higher value than the braking friction force which is the maximum which can be transmitted to the contact point, resulting in the wheels of one or more axles locking. In such cases it is possible for the sliding friction which occurs then to give rise to an undesired formation of flat areas and to a reduction in the braking friction forces which can be transmitted because, with a relatively high relative speed between the friction partners, the coefficient of friction drops from a maximum at a very low relative speed. In order to prevent this, antiskid systems or antiskid regulating systems are used by which, in the case of locking of a brake, the braking force at the affected axle is reduced in order to arrive approximately in the region of static friction or of optimum brake slip again.

SUMMARY

This reduction in the braking forces at axles with locked brakes, which is performed by regulation by an antiskid device, means that the desired deceleration of the rail vehicle or rail vehicle train is, under certain circumstances, not reached and lengthening of the braking distance may occur.

In particular in emergency brake devices in which the emergency brake was previously controlled by a constant or merely antiskid-regulated and/or load-corrected emergency brake pressure, lengthening of the braking distance owing to fluctuating frictional conditions must be absolutely avoided.

Accordingly, the disclosed embodiments address the problem of specifying an emergency brake device and a method for controlling same with the result that the shortest possible braking distance occurs both in the case of a service braking operation as well as in the case of an emergency braking operation.

BRIEF DESCRIPTION OF THE FIGURES

Exemplary embodiments of the invention are illustrated in the drawing and explained in more detail in the following description. In the drawing.

DETAILED DESCRIPTION

Figure 1:
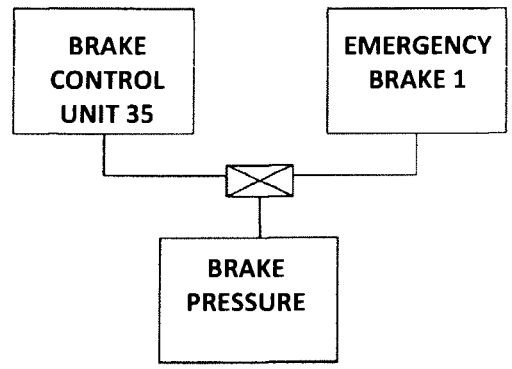
FIG. 1 shows a schematic design of an emergency brake device according to an embodiment.

The method according to the disclosed embodiments may comprise at least the following operations:

a) identifying at least one axle which has inadmissible brake slip during the emergency braking and at which inadmissible brake slip occurs outside a predefined optimum brake slip range, b) identifying at least one axle which has no, or admissible, brake slip during the emergency braking and by which a larger friction braking force can be transmitted than by the at least one axle with inadmissible brake slip, c) adapting the friction braking forces at the at least one axle which has no, or admissible, brake slip such that by at least partially compensating the friction braking force which is lost at the at least one axle owing to the inadmissible brake slip, a deviation of the actual deceleration of the rail vehicle or of the rail vehicle train from a setpoint deceleration predefined by the emergency braking request by this adaptation.

The disclosed embodiments also relate to an emergency brake device comprising at least the following:

a) brake actuators for generating braking friction forces at the friction-braked axles during emergency braking, b) identification means for identifying at least one axle which has inadmissible brake slip during emergency braking and at which brake slip occurs outside a predefined optimum brake slip range, c) identification means for identifying at least one axle which has no, or admissible, brake slip during the emergency braking and by which a larger friction braking force can be transmitted than by the at least one friction-braked axle with inadmissible brake slip, d) sensor means for determining the actual deceleration of the rail vehicle or of the rail vehicle train during the emergency braking, e) an electronic control unit which actuates the brake actuator or the brake actuators at the at least one axle which has no, or admissible, brake slip during the emergency braking in such a way that by at least partially compensating the friction braking force which is lost at the at least one axle as a result of the inadmissible brake slip, a deviation of the actual deceleration of the rail vehicle or of the rail vehicle train from a setpoint deceleration predefined by the emergency braking request can be kept within a tolerable range.

In other words, the basic disclosed concept is that, in the case of emergency braking, the braking forces which are lost at axles with excessive brake slip are compensated by an increase in the braking force at axles with no, or permitted, brake slip (axles with slipping brakes) in order to be able to keep a deviation of the actual deceleration of the rail vehicle or of the rail vehicle train from a setpoint deceleration predefined by the emergency braking request within a tolerable range.

The braking forces which are available overall during emergency braking are consequently distributed to the axles as a function of the braking friction conditions present at the respective axles, with the result that even high setpoint decelerations of the rail vehicle or of the rail vehicle train can be brought about as a result of this.

The basic disclosed concept is, in other words, to adapt or distribute the braking forces within the train during emergency braking in such a way that the frictional forces which are lost as a result of frictional influences are, for example, compensated by antiskid triggering at individual axles and the deviation of the actual deceleration of the train from the desired setpoint deceleration is kept within a tolerable range, independently of which axles of the train or of the vehicle the necessary braking force is generated at.

This compensation can take place both locally within a bogie, within a car as well as throughout the train, i.e. within the train. The compensation may take place within an entire train.

In contrast to the prior art in which regulating systems such as, for example, an antiskid regulating means are implemented only in each case within the scope of an individual axle, an individual bogie or an individual rail vehicle and an exchange of data relating to this, among individual axles, bogies or rail vehicles of a rail vehicle train, only relates to the wheel rotational speeds for the purpose of forming the reference speed, the exchange of data or the data flow within the scope of the disclosed embodiments may be extended to the effect that data relating to unfavorable braking conditions of axles with brake slip and relating to axles which do not have brake slip or are braked at a distance from the brake slip and are therefore available for compensation is also communicated within an entire rail vehicle train, i.e. throughout the train.

According to one particular disclosed embodiment, the compensation of the friction braking force lost at the at least one axle with inadmissible brake slip during the emergency braking takes place directly after operation b) or still during the emergency braking but after operation b) by a predetermined time period.

According to one implementation, an intervention by antiskid regulating performed under the control of the antiskid device at an axle is used as a criterion for the fact that inadmissible brake slip is occurring at this axle during the emergency braking.

The emergency brake device is particularly optionally actuated by a pressure medium and for at least one axle an electronically deceleration-regulated emergency brake pressure is generated as a function of the deviation of the actual deceleration from the setpoint deceleration, and a further emergency brake pressure is generated independently and in parallel therewith. In this context, the further emergency brake pressure is, for example, load-corrected, i.e., adapted to the currently present load.

The respectively higher emergency brake pressure or the respectively higher pilot control pressure of the deceleration-regulated emergency brake pressure or of a deceleration-regulated pilot control pressure representing the latter and of the further emergency brake pressure or of a further pilot control pressure representing the latter may be used to generate the emergency braking force at the at least one axle. It may be that the emergency braking remains uninfluenced by the electronic regulating means and that no deceleration-regulated emergency brake pressure or no deceleration-regulated pilot control pressure which is lower than the further emergency brake pressure or further pilot control pressure which is generated in parallel therewith is used to generate the emergency braking forces, so as to avoid affecting the safety system of the emergency brake. For this reason, the independent and parallel generation of the further emergency brake pressure or of the further pilot control pressure according to the prior art may be maintained. In parallel with this, a deceleration-regulated emergency brake pressure or a deceleration-regulated pilot control pressure is merely formed by the deceleration regulating means, which pressure is increased, for example, by a correction factor with respect to the conventionally generated emergency brake pressure or pilot control pressure and serves to compensate the emergency braking forces which are too low owing to unfavorable frictional conditions and are based on the conventional emergency brake pressure or pilot control pressure, is only carried out in parallel with this. Both emergency brake pressures or pilot control pressures are compared pneumatically, with the result that the higher emergency brake pressure or pilot control pressure is always passed on. If the electronic regulating means in one or more cars therefore fails, only the deceleration-regulated emergency brake pressure or the deceleration-regulated pilot control pressure is lost while in any case the conventional emergency brake pressure or pilot control pressure is then passed on.

According to a disclosed embodiment of the emergency brake device, the latter is therefore actuated by a pressure medium and comprises, for at least one axle, a first valve device which is controlled by the electronic control unit and which generates, for the at least one axle, the deceleration-regulated emergency brake pressure or the deceleration-regulated pilot control pressure as a function of the deviation of the actual deceleration from the setpoint deceleration.

In this context, the first valve device contains, for example, at least one ventilating valve which is connected to a pressure medium supply and a venting valve which is connected to a pressure sink in order to generate the deceleration-regulated emergency brake pressure and the deceleration-regulated pilot control pressure. Furthermore, the electronic control unit then receives a deceleration signal which represents the actual deceleration and which is generated, for example, on the basis of wheel rotational speed signals in order to be able to compensate a deviation from a signal representing the setpoint deceleration by corresponding actuation of the first valve device.

Furthermore, the emergency brake device also comprises a second valve device which is controlled by the electronic control unit and which generates, for the at least one axle, the further emergency brake pressure or the further pilot control pressure, independently of and in parallel with the deceleration-regulated emergency brake pressure or the deceleration-regulated pilot control pressure.

In this context, selection means are provided which, during emergency braking, pass on the higher pressure of the regulated emergency brake pressure or of the deceleration-regulated pilot control pressure and of the further emergency brake pressure or of the further pilot control pressure for the purpose of generating the friction braking force in the event of emergency braking.

According to one disclosed embodiment, the selection means can at least one double non-return valve.

Alternatively, the selection means can contain at least one relay valve which generates a load-corrected brake pressure and has two control inlets, wherein the regulated emergency brake pressure is present as a first control pressure at the one control inlet, and the further emergency brake pressure is present as a second control pressure at the other control inlet, and the relay valve is designed to generate a load-corrected brake pressure for the at least one axle as a function of the respective higher control pressure.

More precise details are apparent from the following description of an exemplary embodiment.

With this understanding in mind, a disclosed embodiment of an emergency brake device 1 is shown in a highly schematic form in FIG. 1 as a component of an antiskid-regulated friction brake system of a rail vehicle train which is composed of a plurality of individual rail vehicles, and the brake system has a number of braked and antiskid-regulated axles (wheel sets). The brake system can be, for example, a directly acting or an indirectly acting electropneumatic friction brake, wherein a brake pressure C acts on brake cylinders which optionally move brake linings into frictional contact with the brake disks which rotate with the axles. The axles are assigned to bogies, optionally two axles per bogie and two bogies per rail vehicle. The electropneumatic friction brake is therefore activated both in the case of service braking and in the case of emergency braking.

An additional antiskid device 37 prevents locking of the wheel sets during braking, both during service braking and also optionally during emergency braking, as a result of which flat areas on the wheels can be avoided. The antiskid protection is optionally microprocessor-controlled, wherein the rotation speeds of the wheel sets of the individual rail vehicles are sensed by wheel rotational speed sensors. The microprocessor in an evaluation logic calculates actuation of antiskid valves from this. Using the antiskid valves, the brake cylinder pressure C is reduced, maintained or increased depending on requirements.

Figure 4:
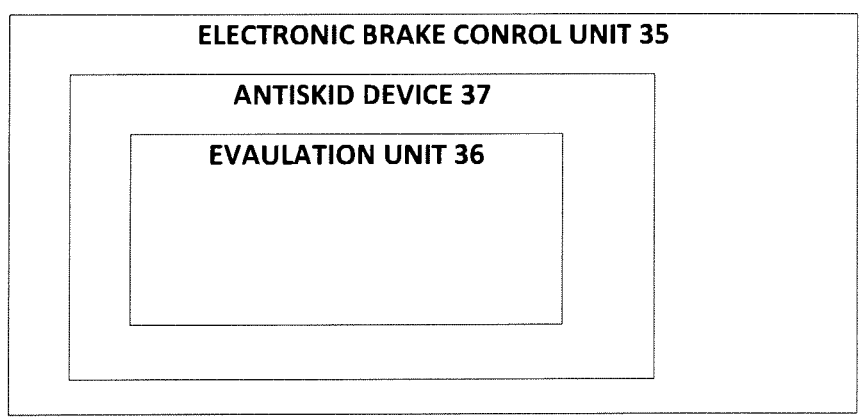
FIG. 4 shows an embodiment wherein the brake control unit 35 includes the evaluation unit 36 of the antiskid device 37.

The electropneumatic friction brake of the rail vehicle train is controlled by one or more brake control units. Wheel rotational speed sensors signal the wheel rotational speeds of the axles to the brake control unit 35 in which the evaluation unit 36 of the antiskid device 37 is optionally also integrated, as illustrated in FIG. 4.

Against this background, according to a method presented here, which may be carried out by routines stored in one or more brake control units, at least the following steps are carried out:

a) identifying at least one axle which has inadmissible brake slip during the emergency braking and at which inadmissible brake slip occurs outside a predefined optimum brake slip range, b) identifying at least one axle which has no, or admissible, brake slip during the emergency braking and by which a larger friction braking force can be transmitted than by the at least one axle with inadmissible brake slip, c) adapting the friction braking forces at the at least one axle which has no, or admissible, brake slip such that by at least partially compensating the friction braking force which is lost at the at least one axle owing to the inadmissible brake slip, a deviation of the actual deceleration of the rail vehicle or of the rail vehicle train from a setpoint deceleration predefined by the emergency braking request by this adaptation.

In other words, in the case of emergency braking by increasing the braking force at axles with no, or permissible, brake slip (axles with skidding brakes), the braking forces which are lost at axles with excessive brake slip are compensated in order to be able to keep a deviation of the actual deceleration of the rail vehicle or of the rail vehicle train from a setpoint deceleration predefined by the emergency braking request within a tolerable range. The setpoint deceleration during emergency braking is dependent on a plurality of factors, for example on the instantaneous load, and is, for example, stored in a characteristic-diagram-dependent fashion, wherein the respective value is retrieved in the case of emergency braking.

In this context, the exchange of data or data flow between the individual cars of the train, which is necessary for the described compensation, optionally takes place in such a way that data owing to unfavorable braking friction conditions of axles with brake slip as well as data relating to axles which have no brake slip or are still braked at a distance from the brake slip and are therefore available for compensation is communicated within the entire rail vehicle train, i.e., throughout the train, in particular optionally between local brake control units which are present in each car or in each bogie. Alternatively or additionally, the described compensation can also take place on a car basis or else only on a bogie basis, i.e. between the friction brakes of individual axles.

Particularly optionally, the emergency brake device generates a deceleration-regulated emergency brake pressure or a pilot control pressure representing the latter, as well as a further emergency brake pressure independently and in parallel therewith or a further pilot control pressure representing the latter, for at least one axle as a function of the deviation of the actual deceleration from the setpoint deceleration of the rail vehicle train. In this context, the further emergency brake pressure or the further pilot control pressure is, for example, load-corrected, i.e. adapted to the load which is present at a particular time. This further emergency brake pressure or this further pilot control pressure corresponds to the prior art, i.e. it is, as a rule, load-corrected and/or antiskid-regulated.

The electronically deceleration-regulated emergency brake pressure or a deceleration-regulated pilot control pressure representing the latter is, in contrast, generated by an electronic brake control, in particular by an electronic "brake control unit" 35, as is illustrated in FIG. 1 by the lefthand branch. In parallel with this, in the case of emergency braking the further, for example load-corrected emergency brake pressure or a pilot control pressure representing the latter is generated as in the prior art, i.e. pressure medium is supplied to the friction brake from a pressure medium supply by an emergency brake valve which is opened in the case of emergency braking. This branch which is on the right of FIG. 1 is illustrated by the term "emergency brake".

Then, of the deceleration-regulated emergency brake pressure or of the deceleration-regulated pilot control pressure representing the latter and of the further emergency brake pressure or of the deceleration-regulated pilot control pressure representing the latter, the respectively higher emergency brake pressure or pilot control pressure, referred to in FIG. 1 generally as "brake pressure" is used to generate the friction braking force at the at least one axle.

It is significant here that no deceleration-regulated emergency brake pressure or no deceleration-regulated pilot control pressure representing the latter which is lower than the further emergency brake pressure which is generated in parallel or than the pilot control pressure representing the latter is used to generate the emergency braking forces, in order to avoid affecting the safety system of the emergency brake. For this reason, the independent and parallel generation of the further emergency brake pressure or of a pilot control pressure representing the latter according to the prior art is maintained. In parallel with this, a regulated emergency brake pressure or a deceleration-regulated pilot control pressure representing the latter is merely formed by the deceleration regulating means, but the emergency brake pressure or pilot control pressure is then increased, for example by a correction factor, with respect to the conventionally generated emergency brake pressure which serves to compensate the emergency braking forces which are too small owing to unfavorable frictional conditions and are based on the conventional emergency brake pressure. Both emergency brake pressures or pilot control pressures which are generated in parallel with and independently of one another are compared pneumatically, with the result that the friction braking forces are always generated by the brake actuators on the basis of the higher emergency brake pressure or pilot control pressure (in FIG. 1 "brake pressure"). If the electronic regulating means or brake control in one or more cars fails, only the deceleration-regulated emergency brake pressure or pilot control pressure therefore fails, while in any case the (conventional) further emergency brake pressure or further pilot control pressure is still available for the brake actuators in order to generate the friction braking forces.

A criterion which is used for the presence of inadmissible brake slip during emergency braking at an axle or at a bogie is, for example, an intervention of antiskid regulating by the antiskid device 37 at this axle or at this bogie, i.e. when antiskid regulating attempts to adapt the brake slip which is present to an optimum brake slip or an optimum brake slip range. In an analogous fashion, the criterion which is used for the presence of admissible brake slip during emergency braking at an axle or at a bogie is optionally non-intervention of the antiskid device 37, with the result that the brake slip at the affected axle or at the affected bogie is already admissible or optimum.

According to one disclosed embodiment, the compensation of the friction braking force which is lost at the at least one axle with inadmissible brake slip during the emergency braking takes place directly after the identification of at least one axle which has no, or admissible, brake slip during the emergency braking and by which a larger friction braking force can be transmitted than by the at least one axle with inadmissible brake slip or still during the emergency braking, but a predetermined time period after this operation.

Figure 2:
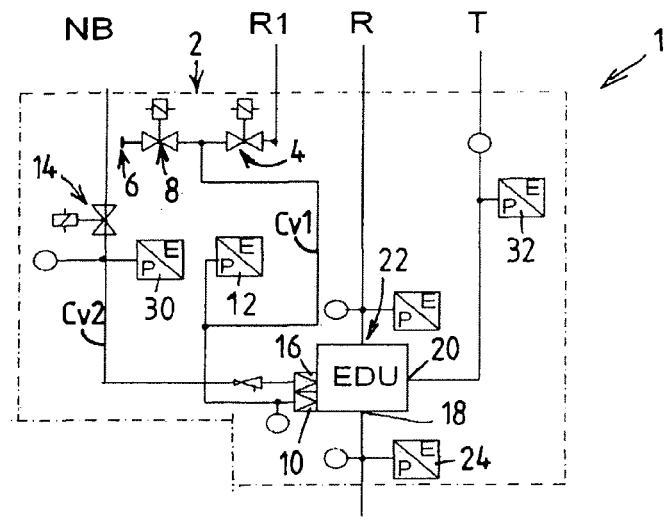
FIG. 2 shows a specific embodiment of the emergency brake device from FIG. 1.

FIG. 2 shows an embodiment of an emergency brake device 1 which is made more specific in contrast with FIG. 1 and which is controlled according to the method described above. The emergency brake device 1 is provided, for example, for the friction brakes of both axles of a bogie, i.e. each of the two axles is assigned a friction brake, wherein in the case of emergency braking the emergency brake device 1 generates an emergency brake pressure C of the same magnitude for both friction brakes. As an alternative to this it is also conceivable to generate an individual emergency brake pressure C for each axle of the bogie.

The emergency brake device 1 from FIG. 1 comprises a first valve device, controlled by an electronic brake control unit which is not explicitly shown here, as an e/p pressure regulator 2 which generates, for the friction brakes of the bogie, a deceleration-regulated pilot control pressure Cv1 for a relay valve device EDU as a function of the deviation of the actual deceleration from the setpoint deceleration during the emergency braking. The e/p pressure regulator 2 contains, for example, at least one electromagnetic ventilating valve 4 which is connected to a pressure medium supply R1, and an electromagnetic venting valve 8 which is connected to a pressure sink 6, in order to generate the deceleration-regulated pilot control pressure Cv1 and to pass it on to a first pneumatic control inlet 10 of the relay valve device EDU. This deceleration-regulated pilot control pressure Cv1 is measured by a pressure sensor 12.

Furthermore, the electronic brake control unit receives a deceleration signal which represents the actual deceleration and which is generated, for example, on the basis of wheel rotational speed signals, in order to be able to compensate a deviation of a signal representing the setpoint deceleration by corresponding actuation of the first valve device 2, which subsequently generates the first pilot control pressure Cv1. Depending on the control deviation, the venting valve 8 therefore connects the first pneumatic control inlet 10 of the relay valve device EDU to the pressure sink 6 or the ventilating valve 4 connects this first pneumatic control inlet 10 to the compressed air supply R1.

Furthermore, the emergency brake device 1 in FIG. 1 comprises a second valve device 14 which is directly controlled by an emergency brake loop, for example, and generates, for the bogie, the further pilot control pressure Cv2 independently of and in parallel with the deceleration-regulated pilot control pressure Cv1. This second valve device 14 comprises, for example, a hard-wired, electromagnetic emergency brake valve which, in the case of emergency braking, passes on a further pilot control pressure Cv2, derived from a, for example, separate pressure medium supply NB (emergency brake), to a second pneumatic control inlet 16 of the relay valve device EDU. This further pilot control pressure Cv2 is measured by a pressure sensor 30.

The emergency brake valve 14, the ventilating valve 4 and the venting valve 8 are optionally embodied as electrically controlled 2/2-way solenoid valves, wherein the emergency brake valve 14 is electrically controlled by an electrical emergency brake loop of the rail vehicle train, and the ventilating valve 4 and the venting valve 8 are electrically controlled by the brake control unit. It is significant here that although the two pilot control pressures Cv1 and Cv2 are formed in response to a common emergency braking request, they are then formed independently of one another, for example by disconnecting the emergency brake loop throughout the train.

The relay valve device EDU contains a double seat valve (not explicitly shown here) with an inlet valve and an outlet valve and is optionally provided with a load correction, i.e. the brake pressure C which is present at a working outlet 18 of the relay valve device is corrected as a function of the respective car load. For this purpose, the relay valve device EDU has a control inlet 20 which is loaded by a load pressure T. The load pressure T is measured here by a pressure sensor 32. Significantly, the relay valve device EDU also has a supply connection 22 for connection to a compressed air supply R.

The relay valve device EDU is furthermore designed to generate, in the case of emergency braking, the (emergency) brake pressure C as a function of the respectively higher pilot control pressure, specifically as a function of the deceleration-regulated pilot control pressure Cv1 which is generated by the first valve device 2 and is present at the first pneumatic control inlet 10, and of the further pilot control pressure Cv2 which is generated by the second valve device 14 and is present at the second pneumatic control inlet 16, which brake pressure C is measured by a pressure sensor 24. Such a relay valve device EDU is known, for example, from DE 10 2004 024 462 A1, whose disclosure content in this regard is here expressly included. In the embodiment in FIG. 2, the selection of the higher pilot control pressure Cv1 or Cv2 takes place for the purpose of forming the brake pressure C in the relay valve device EDU, which for this purpose has two pneumatic control inlets 10, 16.

Figure 3:
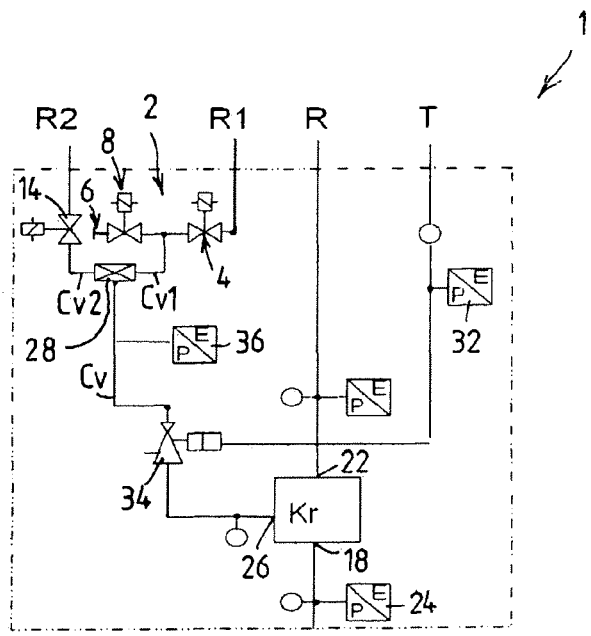
FIG. 3 shows a further embodiment of the emergency brake device from FIG. 1.

In the embodiment according to FIG. 3, the relay valve device Kr has, in contrast to the embodiment in FIG. 2, only a single pneumatic control inlet for a single pilot control pressure Cv, and is therefore not designed to generate, as a function of a plurality of pilot control pressures, a brake pressure C as a function of one of the pilot control pressures.

In this case, for example a double non-return valve or shuttle valve 28 which is arranged or connected upstream of the relay valve device Kr is provided, a pressure inlet of which valve is supplied with the deceleration-regulated pilot control pressure Cv1, and the further pressure inlet of which valve is supplied with the further pilot control pressure Cv2. During emergency braking, of the deceleration-regulated pilot control pressure Cv1 which is generated by the first valve device 2 and of the pilot control pressure Cv2 which is generated by the second valve device 14, the respectively higher, not yet load-corrected pilot control pressure Cv1 or Cv2 is passed on as pilot control pressure Cv to a pressure limiting valve 34 through the double non-return valve or shuttle valve 28, but is previously measured by a pressure sensor 36. The second valve device 14 includes in this context again a customary emergency braking valve which is optionally connected to a separate compressed air supply R2 for the emergency brake.

The pressure limiting valve 34 limits the pilot control pressure Cv, passed on by the double non-return valve 28, as a function of load by applying the load pressure T to it. Said pressure limiting valve 34 applies the then load-corrected pilot control pressure Cv to the pneumatic control inlet 26 of the relay valve device Kr in order, in the case of emergency braking, to generate a corresponding brake pressure C for the bogie as a function of the pilot control pressure Cv.

LIST OF REFERENCE NUMBERS 1 emergency brake device
2 first valve device
4 ventilating valve
6 pressure sink
8 venting valve
10 first control inlet
12 pressure sensor
14 second valve device
16 second control inlet
18 working outlet
20 control inlet
22 supply connection
24 pressure sensor
26 control inlet
28 double non-return valve
30 pressure sensor
32 pressure sensor
34 pressure limiting valve
35 electronic brake control unit
36 evaluation unit
37 antiskid device

The invention claimed is:

1. A method for controlling an emergency brake device of a rail vehicle or of a rail vehicle train which is composed of a plurality of rail vehicles, which rail vehicle or rail vehicle train has a number of axles which are braked by friction brakes, wherein emergency braking is started by an emergency braking request, the method comprising:
using an evaluation unit to identify at least one axle which has inadmissible brake slip during the emergency braking and at which inadmissible brake slip occurs outside a predefined optimum brake slip range,
using the evaluation unit to identify at least one axle which has no, or admissible, brake slip during the emergency braking and by which a larger friction braking force can be transmitted than by the at least one axle with inadmissible brake slip,
under control of an electronic control unit that actuates the brake actuator or the brake actuators at the at least one axle, adapting the friction braking forces at the at least one axle which has no, or admissible, brake slip such that, by at least partially compensating the friction braking force which is lost at the at least one axle owing to the inadmissible brake slip, a deviation of the actual deceleration of the rail vehicle or of the rail vehicle train from a setpoint deceleration predefined by the emergency braking request is kept within a tolerable range.

2. The method of claim 1, wherein the compensation of the friction braking force lost at the at least one axle with inadmissible brake slip during the emergency braking takes place directly after operation b) or still during the emergency braking but after operation b) by a predetermined time period.

3. The method of claim 1, wherein an intervention by the antiskid regulating means at an axle is used as a criterion for the fact that inadmissible brake slip is occurring at this axle during the emergency braking.

4. The method of claim 1, wherein the emergency brake device is actuated by a pressure medium and for at least one axle a deceleration-regulated emergency brake pressure or a deceleration-regulated pilot control pressure ($Cv_1$) is generated as a function of the deviation of the actual deceleration from the setpoint deceleration, and a further emergency brake pressure or a further pilot control pressure ($Cv_2$) is generated independently and in parallel therewith.

5. The method of claim 1, wherein the further emergency brake pressure or the further pilot control pressure ($Cv_2$) is load-corrected.

6. The method of claim 4, wherein the respective higher pressure of the deceleration-regulated emergency brake pressure or of the deceleration-regulated pilot control pressure ($Cv_1$) and of the further emergency brake pressure or of the further pilot control pressure ($Cv_2$) is used to generate the friction braking force at the at least one axle.

7. An emergency brake device of a rail vehicle or of a rail vehicle train composed of a plurality of rail vehicles, which rail vehicle or rail vehicle train has a number of friction-braked axles, the emergency brake device comprising:
- brake actuators generating friction braking forces at the friction-braked axles during emergency braking,
- an evaluation unit that identifies at least one axle which has inadmissible brake slip during emergency braking and at which brake slip occurs outside a predefined optimum brake slip range, wherein the evaluation unit identifies at least one axle which has no, or admissible, brake slip during the emergency braking and by which a larger friction braking force can be transmitted than by the at least one friction-braked axle with inadmissible brake slip,
- d) at least one sensor that determines the actual deceleration of the rail vehicle or of the rail vehicle train during the emergency braking,
- e) an electronic control unit which actuates the brake actuator or the brake actuators at the at least one axle which has no, or admissible, brake slip during the emergency braking in such a way that by at least partially compensating the friction braking force which is lost at the at least one axle as a result of the inadmissible brake slip, a deviation of the actual deceleration of the rail vehicle or of the rail vehicle train from a setpoint deceleration predefined by the emergency braking request is kept within a tolerable range.

8. The emergency brake device of claim 7, further comprising an antiskid regulating device, and in that an intervention by the antiskid regulating means at a friction-braked axle during emergency braking is used as a criterion for whether brake slip outside the predefined optimum brake slip range occurs at this friction-braked axle.

9. The emergency brake device of claim 7, wherein said device is actuated by a pressure medium and comprises, for at least one axle, a first valve device which is controlled by the electronic control unit and which generates, for the at least one axle, a deceleration-regulated emergency brake pressure or a deceleration-regulated pilot control pressure ($Cv_1$) representing the latter as a function of the deviation of the actual deceleration from the setpoint deceleration.

10. The emergency brake device of claim 9, wherein the first valve device contains at least one ventilating valve which is connected to a pressure medium supply and a venting valve which is connected to a pressure sink.

11. The emergency brake device of claim 9, further comprising a second valve device which is controlled by the electronic control unit and which generates, for the at least one axle, a further emergency brake pressure or a further pilot control pressure ($Cv_2$) representing the latter, independently of and in parallel with the deceleration-regulated emergency brake pressure or the deceleration-regulated pilot control pressure ($Cv_1$) representing the latter.

12. The emergency brake device of claim 9 further comprising selection means which, during emergency braking, pass on the higher emergency brake pressure or the higher pilot control pressure ($Cv_1$, $Cv_2$) of the deceleration-regulated emergency brake pressure or of the deceleration-regulated pilot control pressure ($Cv_1$) representing the latter and of the further emergency brake pressure or of the pilot control pressure ($Cv_2$) representing the latter.

13. The emergency brake device of claim 12, wherein the selection means contain at least one double non-return valve (28), to whose pressure inlet the deceleration-regulated emergency brake pressure or the deceleration-regulated pilot control pressure ($Cv_1$) and to whose further pressure inlet the further emergency brake pressure or the further pilot control pressure ($Cv_2$) is applied.

14. The emergency brake device of claim 12, wherein the selection means contain at least one relay valve device (EDU) with two pneumatic control inlets, wherein the deceleration-regulated pilot control pressure ($Cv_1$) is present at the one pneumatic control inlet, as a first control pressure, and the further pilot control pressure ($Cv_2$) is present as a second control pressure at the other pneumatic control inlet, and the relay valve device is designed to generate an emergency brake pressure for the at least one axle, independently of the respectively higher control pressure ($Cv_1$, $Cv_2$).

* * * * *